United States Patent Office 2,865,853
Patented Dec. 23, 1958

2,865,853

METHOD OF REDUCING BOD OF STARCH BEARING EFFLUENT BY ADDITION OF SUBSTITUTED STARCH TO EFFLUENT

Jack B. Batdorf, Wilmington, Del., assignor to Hercules Powder Company, Wilmington, Del., a corporation of Delaware No Drawing. Application June 16, 1955
Serial No. 516,045

3 Claims. (Cl. 210—59)

This invention relates to a novel and unexpected improvement in processes employing starch wherein starch-containing effluents from the operations are discharged into streams, rivers or other bodies of water.

Starch is used extensively in the textile industry in sizing warp preparatory to weaving and in finishing cloth. Starch is also used in the papermaking field as a sizing material, and it has been used rather extensively as a laundry size. In various operations wherein starch is used, it is often necessary to discharge starch-containing effluents into rivers and streams or other bodies of water. Starch has a relatively high biochemical oxygen demand, and the discharging of the starch containing effluents into the water courses or other bodies of water can result in the partial or even total depletion of the oxygen in the water. This is one of the recognized methods of causing severe damage to water courses or other bodies of water. Consequently, the biochemical oxygen demand now being introduced into streams of water from textile mills or other commercial operations is a serious industrial problem, and a convenient method of reducing the biochemical oxygen demand being introduced into the water courses from such commercial operations is highly desirable and, in some instances, essential.

In accordance with this invention, it has been found that in a process wherein starch is employed as a treating agent, such as in a textile mill, and wherein a starch-containing effluent from the process is discharged into a body of water, thus substantially increasing the biochemical oxygen demand of that body of water, the actual biochemical oxygen demand of the starch in said body of water can be appreciably and unexpectedly decreased by incorporating in said body of water a water-soluble ether of starch.

The effect of the addition of a water-soluble ether of starch to a body of water contaminated with starch is shown by the examples hereinbelow. In these examples, B. O. D. refers to the biochemical oxygen demand of the contaminated water which can be defined as the quantity of oxygen required for the biochemical oxidation of the decomposable matter in the water at a given temperature within a given time. The commonly accepted dilution method approved by A. P. H. A. (American Public Health Association) was used to determine B. O. D. All the runs in these examples were carried out in aqueous solutions approximating textile mill practice containing 0.1% or 1000 p. p. m. of either starch or sodium carboxymethyl starch or mixtures thereof. The solutions were kept just below their boiling temperature for one hour and any excess free chlorine was neutralized. A standard amount of each solution was diluted with water in a standard bottle from which all air bubbles were excluded. The dilution water had a known oxygen content measured in p. p. m. It had been inoculated with bacteria and it contained needed nitrogen- and phosphorous-containing bacteria nutrients. The diluted samples were incubated at 20° C. for various periods of time, after which the unused oxygen was determined. The difference between the initial oxygen content and the unused oxygen was the B. O. D. of the sample in p. p. m. To approximate conditions encountered in commercial practice, a small amount of dilute settled domestic sewage was added to each dilution bottle, and the B. O. D. value of this sewage was deducted in the calculation of the B. O. D. of the various samples.

*Example 1*

Following the above procedure, the B. O. D. of a 0.1% aqueous starch solution was measured at various time intervals as follows:

| Days: | B. O. D. |
|---|---|
| 1 | 245 |
| 2 | 549 |
| 3 | 672 |
| 4 | 760 |
| 5 | 812 |

*Example 2*

Following the above procedure, the B. O. D. of a 0.1% aqueous solution of carboxymethylated starch having a degree of substitution of 0.11 was measured at various time intervals as follows:

| Days: | B. O. D. |
|---|---|
| 1 | 102 |
| 2 | 145 |
| 3 | 178 |
| 4 | 210 |
| 5 | 211 |

*Example 3*

Following the above procedure, the B. O. D. of a 0.1% aqueous solution of a 65/35 mixture of carboxymethylated starch (CMS) having a degree of substitution of 0.11 and starch was measured at various time intervals. Also, the expected or calculated B. O. D. of the same solution was determined for the same time intervals using the data observed in Examples 1 and 2. By way of illustration, after one day the B. O. D. of starch is 245 and the B. O. D. of carboxymethylated starch is 102 in 0.1% solutions. In a 65/35 carboxymethylated starch/starch mixture in a 0.1% solution, the expected B. O. D. after one day was calculated to be 152

$$(245 \times 0.35 + 102 \times 0.65 = 152)$$

| Days | B. O. D. | | Ratio of Observed B. O. D. to Calculated B. O. D. |
|---|---|---|---|
| | Observed | Calculated | |
| 1 | 93 | 152 | 0.61 |
| 2 | 239 | 286 | 0.84 |
| 3 | 335 | 351 | 0.96 |
| 4 | 393 | 397 | 0.99 |

*Example 4*

In a manner similar to Example 3 using a 0.1% aqueous solution of a 50/50 mixture of carboxymethylated starch (D. S. 0.11) and starch, the following data were observed and calculated:

| Days | B. O. D. | | Ratio of Observed B. O. D. to Calculated B. O. D. |
|---|---|---|---|
| | Observed | Calculated | |
| 1 | 118 | 173 | 0.68 |
| 2 | 315 | 347 | 0.90 |

*Example 5*

In a manner similar to Example 3 using a 0.1% aqueous solution of a 35/65 mixture of carboxymethylated starch (D. S. 0.11) and starch, the following data were observed and calculated:

| Days | B. O. D. | | Ratio of Observed B. O. D. to Calculated B. O. D. |
|---|---|---|---|
| | Observed | Calculated | |
| 1 | 145 | 195 | 0.74 |
| 2 | 401 | 407 | 0.99 |

The starch derivatives that are employed in the practice of this invention are of the water-soluble type. Among the water-soluble starch ethers that can be used are the alkyl ethers of starch, for example, methyl starch, ethyl starch, propyl starch, and the like, carboxyalkyl ethers of starch, for example, carboxymethyl starch, carboxyethyl starch, carboxypropyl starch, and the like, hydroxyalkyl ethers of starch, for example, hydroxyethyl starch, and mixed ethers of starch, for example, carboxymethyl hydroxyethyl starch. In the preferred form of the invention, carboxymethyl starch is employed to obtain a decrease of the biochemical oxygen demand of starch, and the invention will be discussed hereinafter in greater detail with reference to the use of carboxymethyl starch.

The carboxymethyl starch that is employed has a degree of substitution defined as the number of carboxymethyl groups per anhydroglucose unit such that the starch derivative is substantially water-soluble. The degree of substitution necessary for water solubility is dependent to some extent upon the uniformity of carboxymethylation of the starch. In the above examples, the carboxymethyl starch had a degree of substitution of 0.11, and carboxymethylated starches of higher degrees of substitution can be expected to be water-soluble.

The carboxymethyl starch can be prepared by any of the usual and presently known procedures. For example, starch in the form of corn starch, potato starch, and the like, or wood pulp can be reacted with caustic alkali to form an alkali starch, and the resulting product is then reacted with monochloracetic acid to form the desired carboxymethyl starch in the form of the alkali salt.

The amount of sodium carboxymethyl starch that is employed in the practice of this invention will vary. In the specific examples, ratios of carboxymethyl starch to starch within the range of 35:65 to 65:35 have been shown to produce the desired results. However, proportions outside of this range can be used. The amount of carboxymethyl starch that is actually used will depend upon the conditions existing in the body of water into which the starch containing effluent is being discharged and to some extent upon the amount of biochemical oxygen demand reduction desired. Generally, from 0.1 to 0.5 part of carboxymethyl starch per part of starch will produce an effective reduction in the biochemical oxygen demand of the body of water contaminated with the starch, but a more pronounced reduction in B. O. D. can be obtained by increasing the amount of carboxymethylated starch employed.

Usually, it will be found desirable to mix the carboxymethyl starch with the starch size prior to its use in the commercial operation, particularly in warp sizing procedures. The carboxymethyl starch, as well as the starch, is an effective sizing agent and, consequently, it can be employed to replace a substantial portion of the starch size. In fact, it is preferred to employ the carboxymethyl starch in this manner. However, in some operations it may be desired to employ only the starch in the commercial operation, and in that event the carboxymethyl starch will be added to the starch-containing effluent from the process. Alternatively, the carboxymethyl starch may be added directly to the body of water that has been or is being contaminated by the starch-containing effluent.

In the preferred form of this invention, a sizing composition containing both starch and carboxymethyl starch is employed as a sizing medium, and the effluent from the process containing both starch and carboxymethyl starch is discharged into a stream of water. In addition to the starch and carboxymethyl starch, the sizing composition may contain other ingredients such as lubricants, for example, microcrystalline wax, beeswax, carbowax, and the like, and defoaming agents such as sulfonated oils, calcium chloride, and the like. However, the carboxymethyl starch is the important component of such sizing compositions for substantially reducing the biochemical oxygen demand of any stream or other body of water that is being contaminated by the effluent from such a process.

It is apparent from the data in the above examples that the carboxymethyl starch effectively reduces the biochemical oxygen demand of the body of water contaminated with the starch containing effluent for only several days. Thus, this invention can be most desirably practiced in an operation where the starch containing effluent from the sizing operation is discharged into a relatively small stream which in a short time discharges into a somewhat larger stream or tidal water. In that manner, the effectiveness of the carboxymethyl starch in reducing the biochemical oxygen demand of the starch is realized in the relatively small contaminated stream, and after the relatively small stream empties into the comparatively larger body of water the reduction in biochemical oxygen demand is no longer important and necessary.

What I claim and desire to protect by Letters Patent is:

1. In a process wherein starch is employed as a treating agent and wherein an effluent from said process containing starch is discharged into a body of water thereby increasing the biochemical oxygen demand of said body of water, the improvement which comprises incorporating in said body of water a water-soluble starch either in an amount sufficient to give a starch ether/starch ratio of 35/65–65/35, said starch ether containing substituent groups selected from te class consisting of carboxyalkyl and hydroxyalkyl substituent groups in an amount of at least 0.11 substituent group per anhydroglucose unit.

2. In a process wherein starch is employed as a treating agent and wherein an effluent from said process containing starch is discharged into a body of water, thereby increasing the biochemical oxygen demand of said body of water, the improvement which comprises incorporating in said body of water a water-soluble carboxyalkyl starch ether in an amount sufficient to give a carboxyalkyl starch ether/starch ratio of 35/65–65/35, said ether containing about 0.11 carboxyalkyl group per anhydroglucose unit.

3. In a process wherein starch is employed as a warp sizing agent and wherein an effluent from said process containing starch is discharged into a body of water, thereby increasing the biochemical oxygen demand of said body of water, the improvement which comprises incorporating in said body of water a water-soluble carboxymethyl starch in an amount sufficient to give a carboxymethyl starch/starch ratio of 35/65–65/35, said carboxymethyl starch containing about 0.11 carboxymethyl group per anhydroglucose unit.

References Cited in the file of this patent

UNITED STATES PATENTS 2,663,989     Schlatter et al.     Dec. 29, 1953

OTHER REFERENCES

Du Pont (Brochure A–830) "Sodium CMC." Copyright 1950.